United States Patent

[11] 3,627,241

[72] Inventors Louis J. Santirocco;
Richard C. Lathrop, both of Rochester, N.Y.
[21] Appl. No. 42,649
[22] Filed June 2, 1970
[45] Patented Dec. 14, 1971
[73] Assignee The United States of America as represented by the Secretary of Commerce

[54] PROJECTED IMAGE VIEWER SUPPORT
7 Claims, 14 Drawing Figs.

[52] U.S. Cl. .................................................. 248/11, 248/125, 353/74
[51] Int. Cl. ............................................... F16m 1/00
[50] Field of Search ........................................ 248/11, 125; 353/74

[56] References Cited
UNITED STATES PATENTS
2,211,825  8/1940  Kindelmann ................. 248/11
2,430,826  11/1947  Rodman ...................... 248/11

Primary Examiner—Jacob L. Nackenoff
Attorneys—David Robbins and Alvin J. Englert ABSTRACT: A support for a projected image viewing apparatus of the kind having a screen which displays an image projected thereon for viewing by an observer, is respectively provided with mechanisms for vertically adjusting the apparatus to any one of a plurality of elevations relative to the observer and angularly adjusting the apparatus to any one of a plurality of tilted positions relative to a selected one of the plurality of elevations, so as to vary the elevation and the angle at which the screen can be viewed by the observer. The vertically and angularly adjusting mechanisms are interconnected to maintain the center of the screen at a selected elevation when the apparatus is angularly adjusted to a selected one of the plurality of tilted positions.

LOUIS J. SANTIROCCO
RICHARD C. LATHROP
INVENTORS

BY
David Gobbins
ATTORNEY

PATENTED DEC 14 1971

LOUIS J. SANTIROCCO
RICHARD C. LATHROP
INVENTORS

BY

David Robbins

ATTORNEY

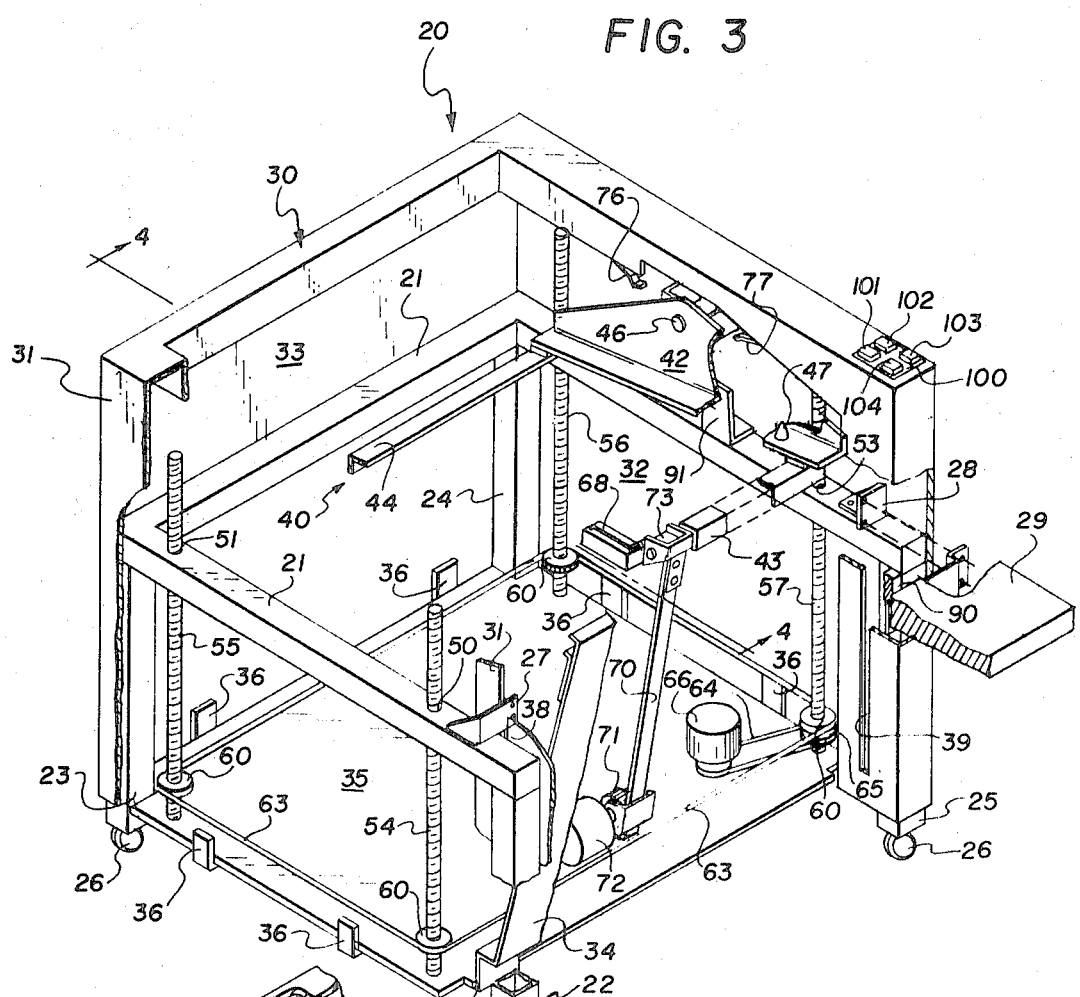

LOUIS J. SANTIROCCO
RICHARD C. LATHROP
INVENTORS

BY

*David Gobbins*

ATTORNEY

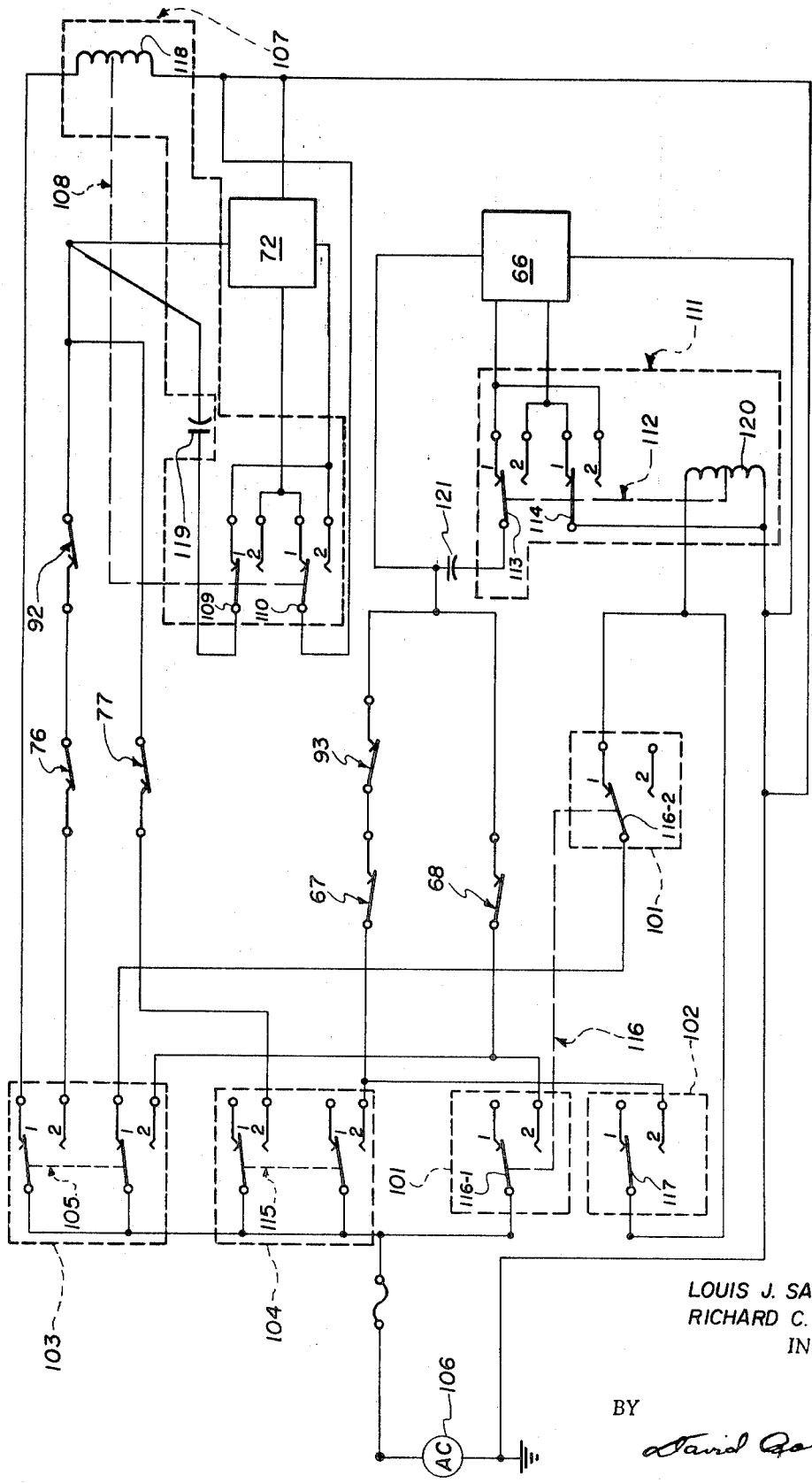

LOUIS J. SANTIROCCO
RICHARD C. LATHROP
INVENTORS

BY

*David Gobbins*

ATTORNEY

PROJECTED IMAGE VIEWER SUPPORT

CROSS-REFERENCE TO RELATED APPLICATION

Reference is made to commonly assigned copending U.S. Pat. application Ser. No. 42,650, entitled "Card Handling Apparatus," filed in the names of Louis J. Santirocco, Duane L. Rose and John W. Scofield on June 2, 1970.

BACKGROUND OF THE INVENTION

1. Field of the Invention

The present invention relates to a support for a projected image viewing apparatus and, more particularly, to a novel and improved support which is operable to tiltingly adjust the apparatus such that the projected image display screen thereof can be moved to any one of a plurality of viewing positions and at the same time automatically maintain a selected point on the screen at a fixed elevation.

2. Description of the Prior Art

It is often desirable to project an optical image in magnified form onto a viewing screen and it is for such purpose that apparatus, generically referred to as projected image viewers, have been constructed. Projected image viewing apparatus, of the kind presently known, characteristically are provided with an optical reader or viewer having a screen which is usually mounted on the reader casing in fixed relation thereto. The screen may be a plate of transparent glass or translucent plastic having a frosted surface which will arrest and display an image projected thereon, either directly or indirectly, by a light-projecting optical system. Most advantageously, such apparatus often has a separable or united workstation support which is provided with a mechanism for vertically raising and lowering the reader relative to a person observing an image projected on the screen, whereby a preferred reader elevation can be selected. Alternatively, or in combination with the reader elevating mechanism, the workstation support may be provided with a mechanism for angularly or tiltingly adjusting the reader to several predetermined angular or tilted positions, any one of which can be selected, for displaying an image projected on the screen to the observer. The reader tilting mechanism is operable to change the angular position of the image display screen relative to the observer, should it be necessary to reduce any existing glare arising from the reflection of ambient or otherwise extraneous light hitting the screen surface. Generally, the reader tilting and elevating mechanisms of the workstation support are positioned in spaced relation and suitable locking means is mounted thereon for respectively securing the reader in selectively tilted and elevated positions relative to the observer.

As described above, with a workstation support having an optical reader tilting and elevating mechanism, the operator can tiltingly adjust such a reader in order to select the angle at which the projected image display screen is desired to be scanned. However, if the reader is angularly adjusted about a pivot point which is spaced from the screen, then as the reader is moved to the various tilted positions, the center of such screen most likely will rise or fall with respect to the selected elevation of the reader and in accordance with the direction of angular adjustment thereof. Heretofore known optical reader tilting and elevating mechanisms for a projected image viewer support generally function independent of each other and are not interacting, so that if the reader tilting mechanism is operated to angularly adjust the reader to any one of the various tilted positions relative to a se reader elevation, the observer must then operate the reader elevating mechanism to raise or lower the tilted projected until the screen center has been readjusted to the desired, i.e. selected, elevation thereof.

SUMMARY OF THE INVENTION

Accordingly, it is an object of the present invention to provide a novel and improved support for a projected image viewing apparatus.

Another object of the present invention is to provide a projected image viewer support which is operable to elevatingly adjust such a viewer to any one of a variety of elevations relative to a person observing a projected image received and displayed on the viewer screen.

Still another object of the present invention is to provide a projected image viewer support which is operable to angularly or tiltingly adjust such a viewer to any one of a variety of angular or tilted positions so as to vary the angle at which the projected image display screen can be viewed by the observer.

Yet another object of the present invention is to provide a projected image viewer support which automatically maintains a selected point on the projected image display screen of the viewer at a fixed elevation relative to the observer, when such viewer is angularly or tiltingly adjusted to the various angular or tilted positions.

And yet another object of the present invention is to provide a projected image viewer support which requires a minimize amount of operation for tiltingly and elevatingly adjusting the viewer.

In accordance with a preferred embodiment of the present invention there is provided a support for a projected image viewing apparatus of the kind having a screen which displays an image projected thereon for viewing by an observer. Such a support comprises a frame which is housed in an enclosure, the enclosure being arranged on the frame in elevation adjustable relation. Moreover, the enclosure respectively supports a mechanism for elevatingly adjusting the projected image viewing apparatus and such enclosure to any one of a plurality of predetermined elevations relative to the frame and a mechanism for angularly adjusting such apparatus to any one of a plurality of tilted positions relative to a selected one of the plurality of elevations, whereby the observer can vary the elevation and the angle at which the screen is desired to be viewed. The elevatingly and angularly adjusting mechanisms are interconnected to maintain a point on the screen, such as the center thereof, at a selected elevation as the apparatus is angularly adjusted to a selected one of the plurality of tilted positions.

A carriage removably supports the projected image viewing apparatus at any one of the plurality of elevations and tilted positions and is pivotally connected to the enclosure for angular adjustment of such apparatus to any one of the plurality of tilted positions. The frame is connected to a workshelf in fixed relation by a member which extends through a slot in the enclosure, so that such enclosure and the carriage can be elevatingly adjusted relative to the workshelf.

BRIEF DESCRIPTION OF THE DRAWINGS

The above-mentioned and other features and objects of the present invention and the manner of obtaining them will become more apparent by reference to the following detailed description of the preferred embodiment of the present invention taken in conjunction with the accompanying drawings wherein:

FIG. 3 is a perspective view, mostly in section, of the support, showing a mechanism for vertically adjusting the carriage and a support shell to any one of a plurality of predetermined elevations relative to a support frame and a mechanism for angularly adjusting the carriage to any one of a plurality of tilted positions relative to a selected one of the plurality of elevations;

FIG. 7 is a perspective view of a switching assembly for limiting the range of angular adjustment of the carriage;

FIG. 8 is a schematic diagram of an electrical circuit for interlocking the vertically and angularly adjusting mechanisms when the tilted position of the carriage is varied;

DESCRIPTION OF THE PREFERRED EMBODIMENT

Figure 1:
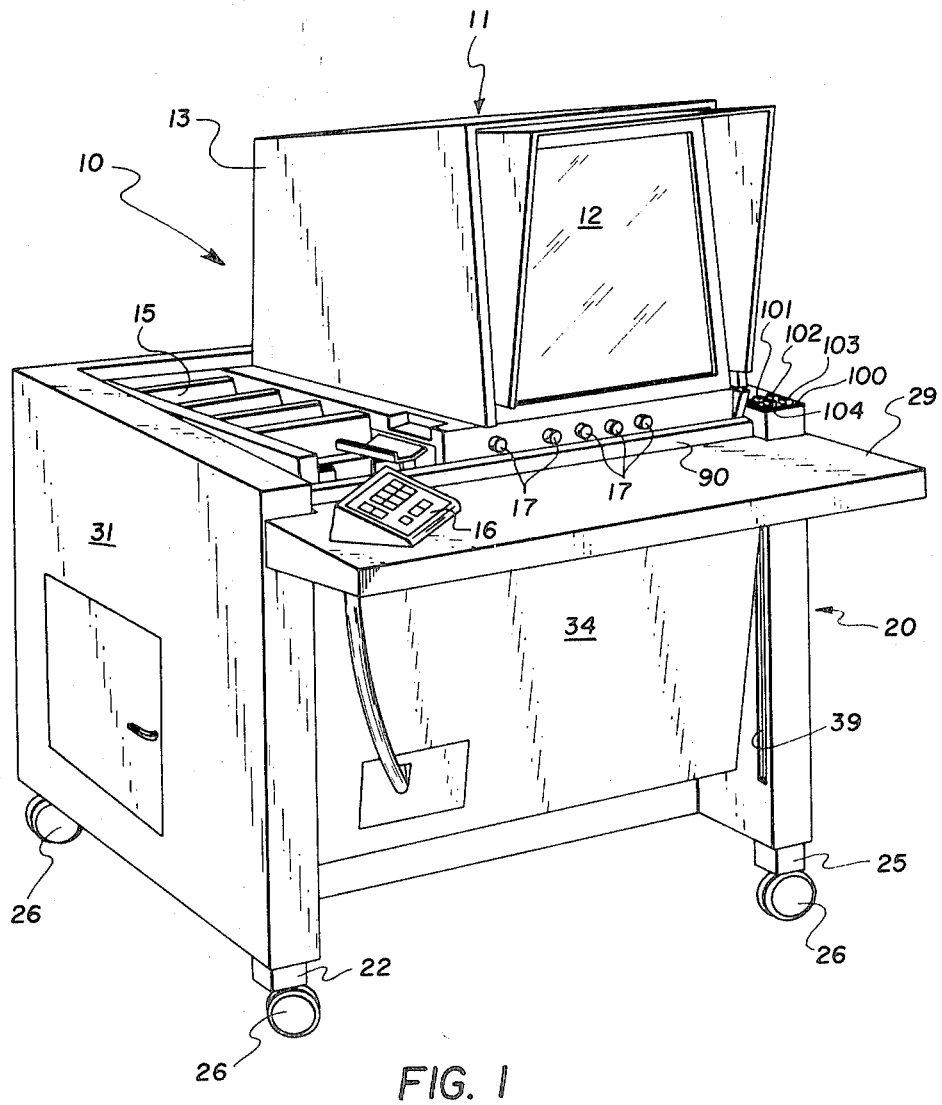
FIG. 1 is a perspective view of a projected image viewing apparatus and a support therefor in accordance with a preferred embodiment of the present invention, showing the manner in which such apparatus is positioned on the support.

Before proceeding with a description of the support per se, it may be well to first describe in brief one form of the projected image viewing apparatus with which the support can be used. Such an apparatus is shown in FIG. 1 and is more fully disclosed in commonly assigned copending U.S. Pat. application Ser. No. 42,650, entitled "Card Handling Apparatus," filed in the names of Louis J. Santirocco, Duane L. Rose, and John W. Scofield on June 2, 1970. Projected image viewing apparatus 10 is of the kind wherein there is provided an optical reader or viewer 11 having a screen 12 which is mounted on the reader casing 13 in fixed relation thereto. The screen is constructed preferably from a plate of transparent glass or translucent plastic having a frosted surface which will arrest and display an image projected thereon for viewing by an observer, generally indicated by the reference numeral 14 and shown in FIG. 9. Most advantageously, the reader 11 has a light-projecting optical system (not shown) which is positioned inside of the reader casing 13 for projecting an image from a film strip (not shown), such as a microfiche for example, onto the screen 12. The film strips, when not being viewed, can be stored in the bins 15. Operation of the projected image viewing apparatus is controlled from the console 16, while an image projected on the screen 12 may be adjusted as to brightness, focus or the like by selection rotation of the knobs 17.

Considering now a preferred embodiment of the present invention there is shown in FIGS. 1 and 3 a support 20 for the projected image viewing apparatus 10. Such a support is provided with a framelike structure comprising a U-shaped member 21 which is supported by the legs 22, 23, 24 and 25. Preferably, each of the frame legs has a roller assembly 26 mounted thereon to facilitate movement of the support; and, as shown in FIG. 3, the legs 22 and 25 have respectively secured thereto a pair of bracket members 27 and 28 for removably connecting a workshelf 29 to such frame.

Referring now to FIG. 3, it can be seen that the framelike structure is, for the most part, housed in a shell 30 which is open at the top and has a pair of spaced sidewalls 31 and 32, a rear wall 33, a front wall 34 and a baseplate 35. The baseplate of the shell is supported by a plurality of L-shaped bracket members 36, pairs of which are respectively mounted on the interior surface of each of the side and rear walls 31–33, and is further supported by a lip portion 37 of the front wall 34. As the shell is arranged on the frame in vertically adjustable relation, the front wall thereof is provided with a spaced pair of vertically extending guide slots 38 and 39 through which respectively extend the bracket members 27 and 28. Accordingly, the shell can be vertically adjusted to any one of a plurality of elevations relative to the workshelf 29 by a mechanism to be described hereinafter in detail.

Figure 2:
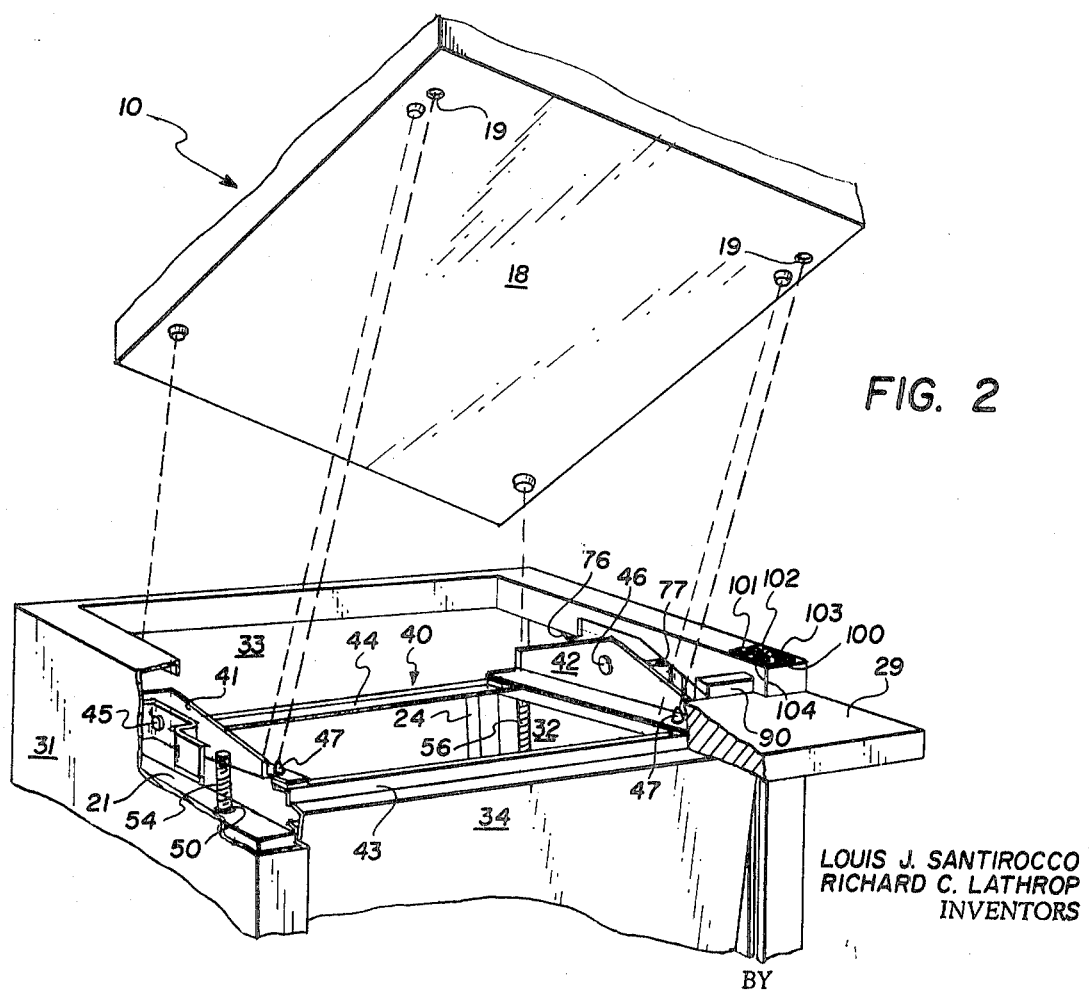
FIG. 2 is a partial perspective view, partly in section, of the support and the underside of the projected image viewing apparatus, showing a carriage member of the support on which such apparatus can be mounted in removable fashion.

A carriage assembly 40 of the support 20 is adapted to support the projected image viewing apparatus 10, when a bottom plate 18 of such apparatus is received through the open top of the shell 30, in the manner shown by FIG. 2. The carriage assembly comprises a pair of spaced end members 41 and 42 which are interconnected by the bars 43 and 44 longitudinally extending therebetween in spaced relation. Preferably, each of the bars is provided with a stud 47 which respectively mates with an aperture 19 in the bottom plate 18 for securing the apparatus 10 to the carriage assembly. As can be seen, the carriage end members 41 and 42 are pivotally connected to the shell walls 31 and 32 respectively by the pins 45 and 46, so that the carriage assembly can be angularly adjusted to any one of a plurality of tilted positions relative to the workshelf 29 by a mechanism to be described hereinafter in detail. Moreover, as the shell is vertically adjustable relative to the workshelf the carriage assembly can be angularly adjusted relative thereto at any one of a plurality of elevations.

Figure 4:
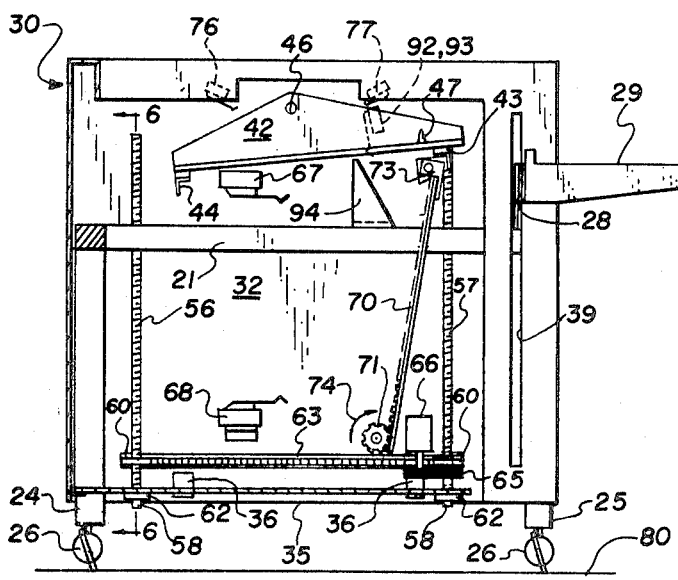
FIG. 4 is a cross-sectional view of the support taken along the line 4—4 of FIG. 3.
Figure 6:
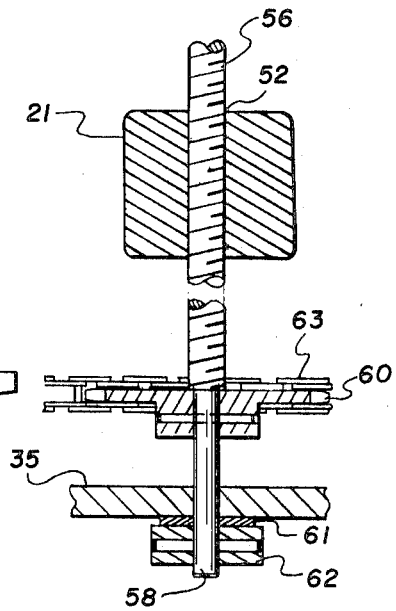
FIG. 6 shows a cross-sectional view of a portion of the vertically adjusting mechanism taken along the line 6—6 of FIG. 4.

The mechanism for vertically adjusting the shell 30 to any one of a plurality of elevations relative to the workshelf 29 comprises screw-threaded apertures 50, 51, 52 and 53 which, as shown in FIGS. 3, 4 and 6, are formed in the U-shaped frame member 21. Extending through these openings so as to be in screw-threaded engagement with the U-shaped frame member are rotatable screw rods 54, 55, 56 and 57. At their lower ends the screw rods are each provided with an unthreaded portion 58 which, as shown in FIG. 6, is fixed to a sprocket 60 and journaled in the shell baseplate 35. The screw rods are respectively secured below the underside of the baseplate by suitable means, such as the washer 61 and the pin and cap assembly 62 for example. As is apparent from FIG. 3 and the description hereinbefore, rotation of the screw rods 54–57 in a common direction will result either in a rise or fall of the shell 30 relative to the frame member 21. Vertical adjustment of the shell corresponds in direction and degree thereof respectively to the direction and degree of rotation of the screw rods. Such rotation of the screw rods is accomplished by driving an endless sprocket chain 63 which operatively engages each of the sprockets 60. The chain 63 is driven in response to rotation of the screw rod 57 which is rotated when an endless sprocket chain 64, operatively engaging a sprocket 65, is driven by a bidirectional motor 66 which is mounted on the baseplate 35, the sprocket 65 being fixed to the screw rod 57. Accordingly, energization of the bidirectional motor 66 will rotate the screw rods in a common direction so that the shell can be vertically adjusted to any one of a plurality of discrete elevations relative to the workshelf 29.

Figure 10:
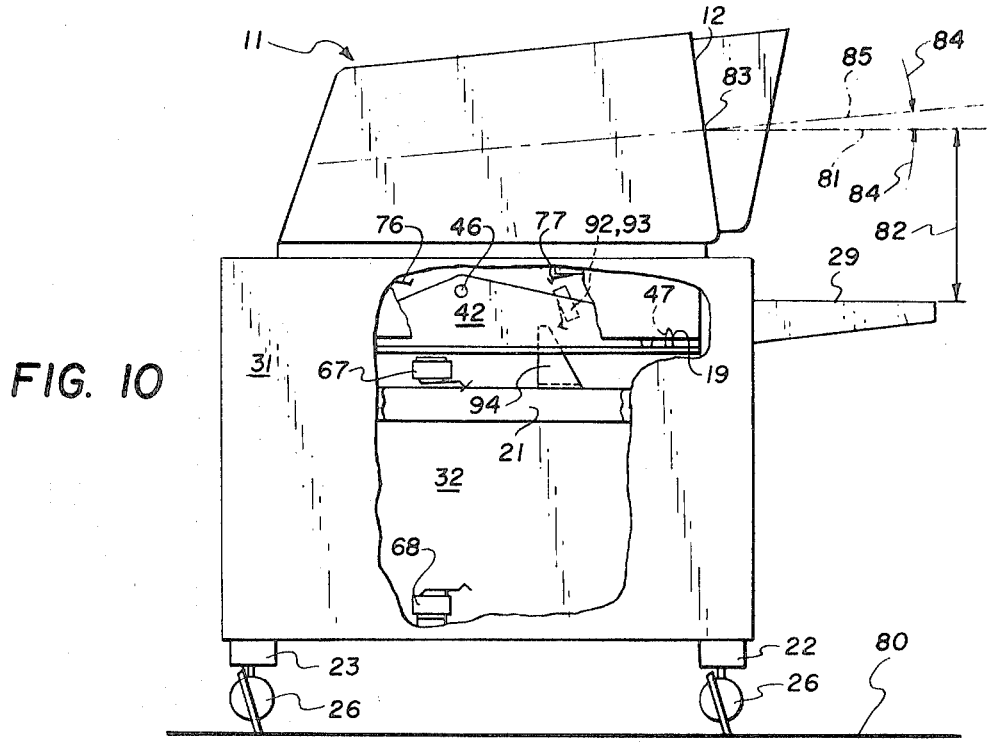
FIG. 10 is a side elevation view, partly in section, of the support and the projected image viewing apparatus, showing the vertical adjustment of such apparatus to a minimum elevation thereof.
Figure 11:
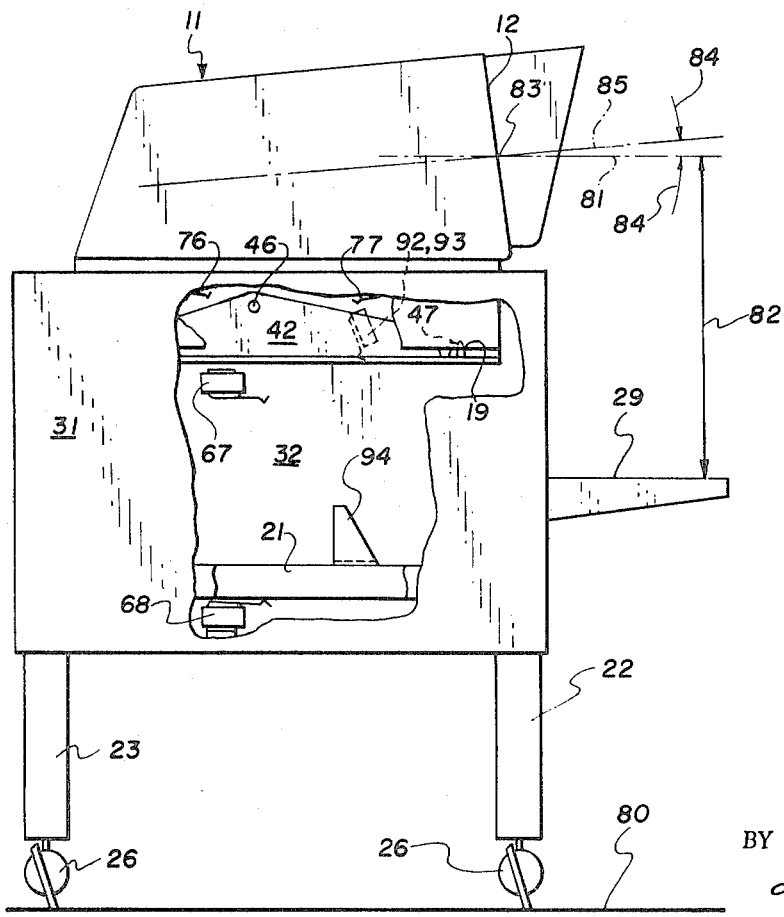
FIG. 11 is a side elevation view similar to that of FIG. 10, showing the vertical adjustment of the apparatus to a maximum elevation thereof.

Vertical adjustment of the shell 30 to any one of a plurality of elevations is restricted to those elevations between a minimum elevation thereof, as shown in FIG. 10, and a maximum elevation thereof, as shown in FIG. 11. For the purpose of such elevation restriction of the shell, there is provided a minimum elevation switch 67 and a maximum elevation switch 68. Both of these switches are mounted on the side wall 32 of the shell 30 in vertically spaced relation so as to be respectively opened in response to contact with the U-shaped member 21. As will be apparent from the description of FIG. 8 provided hereinafter in detail, the opening of the switch 68 (FIG. 11) automatically stops vertical adjustment of the shell 30 in a raising manner, whereas the opening of the switch 67

(FIG. 10) automatically stops vertical adjustment of such shell in a lowering manner.

Figure 5:
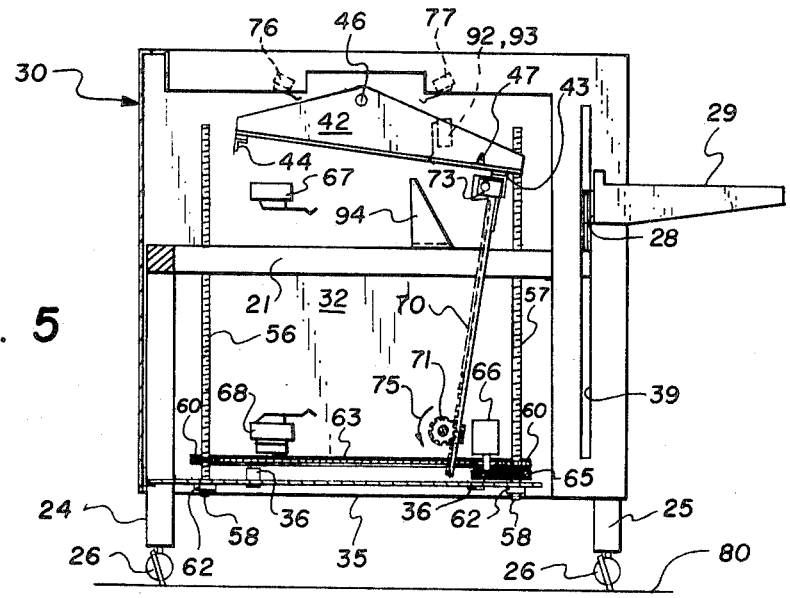
FIG. 5 is a cross-sectional view similar to that of FIG. 4, showing the carriage and the shell of the support respectively at a tilted position and an elevation which differ from those shown in FIG. 4.

As can be seen in FIG. 3, the mechanism for angularly adjusting the carriage assembly 40 to any one of a plurality of tilted positions relative to a selected elevation thereof and the workshelf 29 comprises cooperatively engaging rack 70 and pinion 71. The pinion is rotated by a bydirectional motor 72 which is mounted on the shell baseplate 35. Moreover, the rack is pivotally connected to the bar 43 of the carriage assembly 40 by a coupling assembly 73. Accordingly, if the pinion, as shown in FIG. 4, is rotated in a clockwise direction indicated by the arrow 74 the carriage assembly will be similarly pivoted about the pins 45 and 46 from the tilted carriage position shown in FIG. 4 to such a position thereof as shown in FIG. 5. Alternately, if the pinion, as shown in FIG. 5 is rotated in a counterclockwise direction indicated by the arrow 75 the carriage assembly will be similarly pivoted about the pins 45 and 46 from the tilted carriage position shown in FIG. 5 to such a position thereof as shown in FIG. 4.

Figure 12:
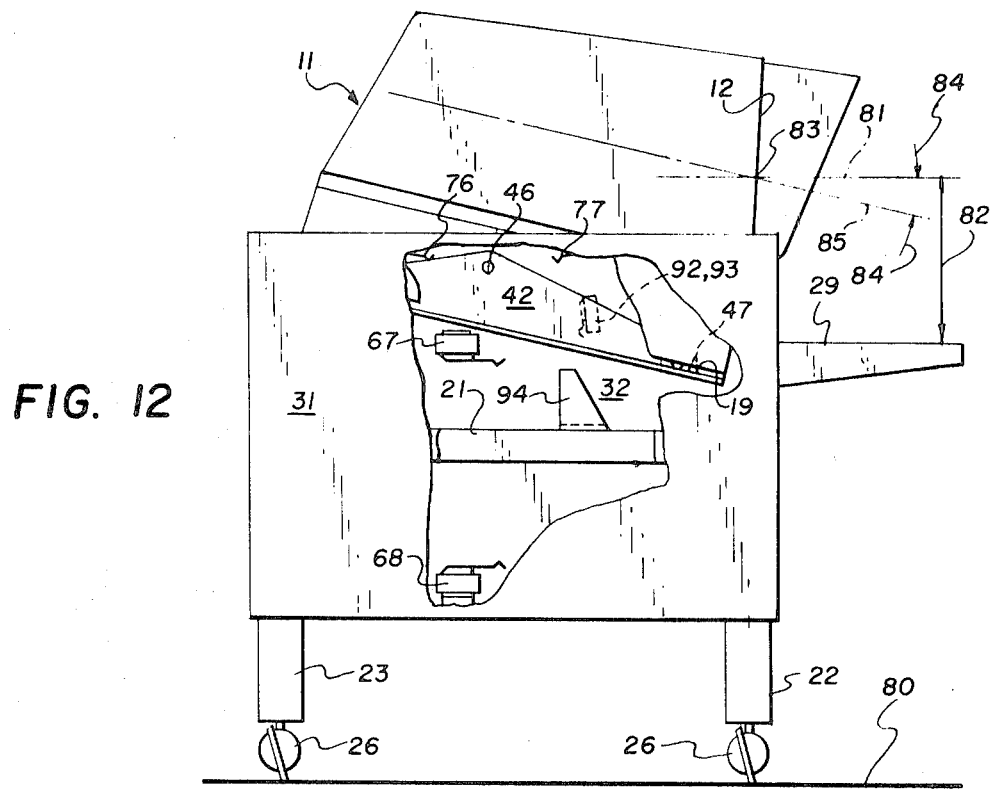
FIG. 12 is a side elevation view similar to that of FIG. 10, showing the angular adjustment of the apparatus to a maximum forward tilted position relative to a selected elevation thereof.
Figure 13:
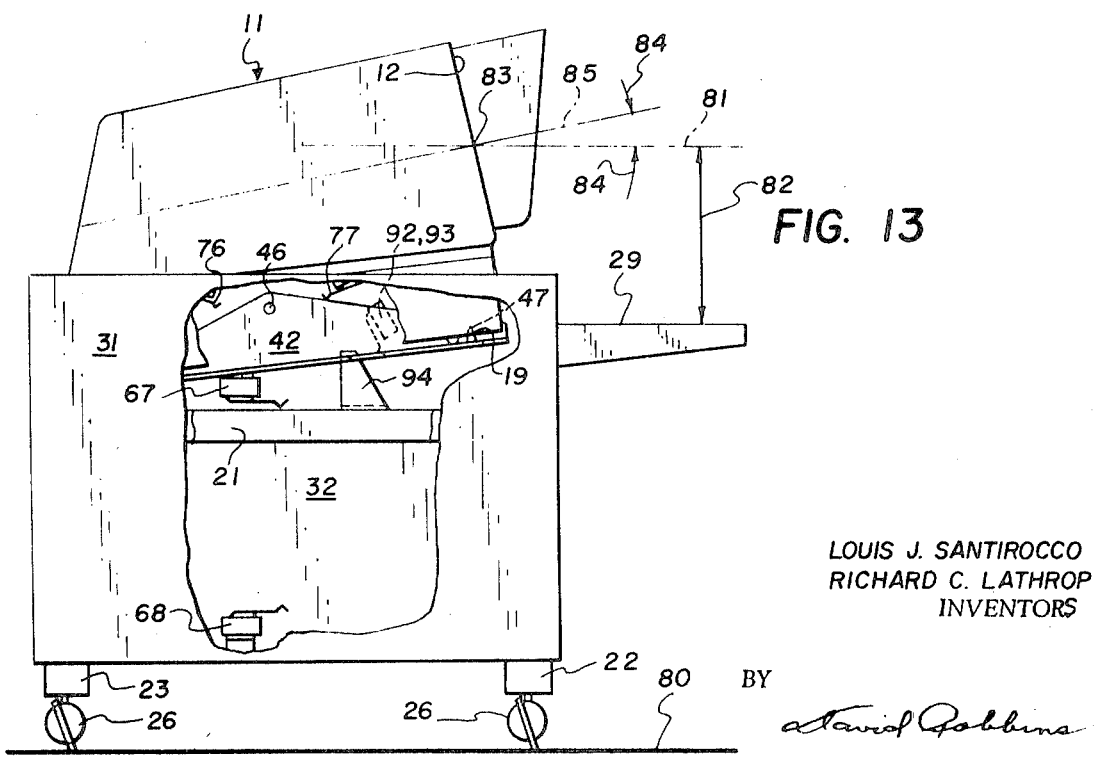
FIG. 13 is a side elevation view similar to that of FIG. 10, showing the angular adjustment of the apparatus to a maximum rearward tilted position relative to the selected elevation thereof.

Angular adjustment of the carriage assembly 40 to anyone of the plurality of tilted positions relative to a selected elevation thereof is restricted to those tilted positions between a maximum forward tilted position as shown in FIG. 12 and a maximum rearward tilted position as shown in FIG. 13. For the purpose of such tilting restriction of the carriage assembly, there is provided a maximum forward tilt switch 76 and a maximum rearward tilt switch 77. Both of these switches are mounted on the sidewall 32 of the shell 30 in horizontally spaced relation so as to be respectively opened in response to contact with the carriage assembly. As will be apparent from the below description of FIG. 8, the opening of the switch 76 (FIG. 12) automatically stops angular adjustment of the carriage assembly 40 in a forward tilting manner, whereas the opening of the switch 77 (FIG. 13) automatically stops angular adjustment of such carriage in a rearward tilting manner.

Figure 9:
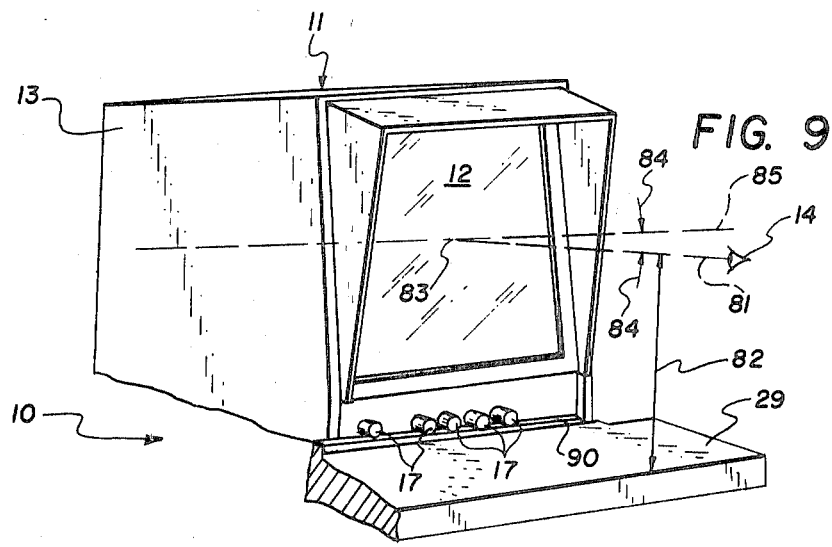
FIG. 9 is a partial perspective view of the projected image display screen and a workshelf for the support, showing the horizontal and vertical relation of the center of such screen to an observer of a projected image displayed thereon.

It can now be appreciated that if the projected image viewing apparatus 10 is positioned on the carriage assembly 40 of the support 20 in the manner shown by FIG. 1 and 2 such apparatus can be vertically adjusted to any one of a plurality of predetermined elevations, relative to the frame worksheelf 29 and a floor 80 on which the support is preferably stood, by the vertically adjusting mechanism described above (see FIGS. 10 and 11). Moreover, such apparatus can be angularly adjusted to any one of a plurality of discretely tilted positions relative to the frame worksheelf and a selected one of the plurality of elevations by the angularly adjusting mechanisms described above (see FIGS. 12 and 13). However, should the observer 14, as shown in FIG. 9, angularly adjust the apparatus relative to his horizontally extending line of vision 81 and the vertical distance (indicated by the arrows 82) between the frame worksheelf and such vision line; then, in accordance with the forward or rearward direction of such adjustment, one normally assumes that the center 83 of the screen 12 will be lowered or raised relative to the vision line. That is to say, if the apparatus is angularly adjusted to the maximum forward tilted position, as shown in FIG. 12, the center of the screen will be lowered below the vision line unless the apparatus is compensatingly raised so as to restore such center to the elevation of the vision line. Conversely stated, if the apparatus is angularly adjusted to the maximum rearward tilted position, as shown in FIG. 13, the center of the screen will be raised above the vision line unless the apparatus is compensatingly lowered to restore such center to the elevation of the vision line. Therefore, in accordance with the present invention a mechanism, to be described below in detail, is provided for interlocking the vertically and angularly adjusting mechanisms to maintain a point on the screen, such as the center thereof, at a selected elevation as the angle (indicated by the arrows 84) between the horizontally extending vision line 81 and a centerline 85 of such screen is varied in degrees. It will be understood that such angle represents the projected image display angle of the screen.

Referring now to FIG. 8, there is shown the mechanism for interlocking the vertically and angularly adjusting mechanisms in a manner such that as the carriage assembly 40 is angularly adjusted to the various tilted positions it is, at the same time, compensatingly restored vertically to the previously selected elevation thereof. Such an interlocking mechanism is operated from a console 100 which is preferably mounted on a top portion of the shell 30, see FIGS. 1 and 3. The console is respectively provided with "raise" 101, "lower" 102, "tilt forward" 103, and "tilt rearward" 104 buttons; though it should be appreciated that other appropriate control means are equally suitable. As will be understood from the description below, individual depression of the "raise" and "lower" buttons automatically causes the carriage assembly together with the shell to be respectively raised and lowered, while depression of the "tilt forward" button automatically causes the carriage assembly to be tilted forward and, together with the shell, compensatingly raised. Moreover, depression of the "tilt rearward" button automatically causes the carriage assembly to be tilted rearward and, together with the shell, compensatingly lowered. Of course, the "raise," "lower," "tilt forward" and "tilt rearward" operations will not begin in response to depression of an appropriate one of the buttons 101-104 if the switches 68, 67, 76 and 77 are opened as described hereinbefore.

Figure 14:
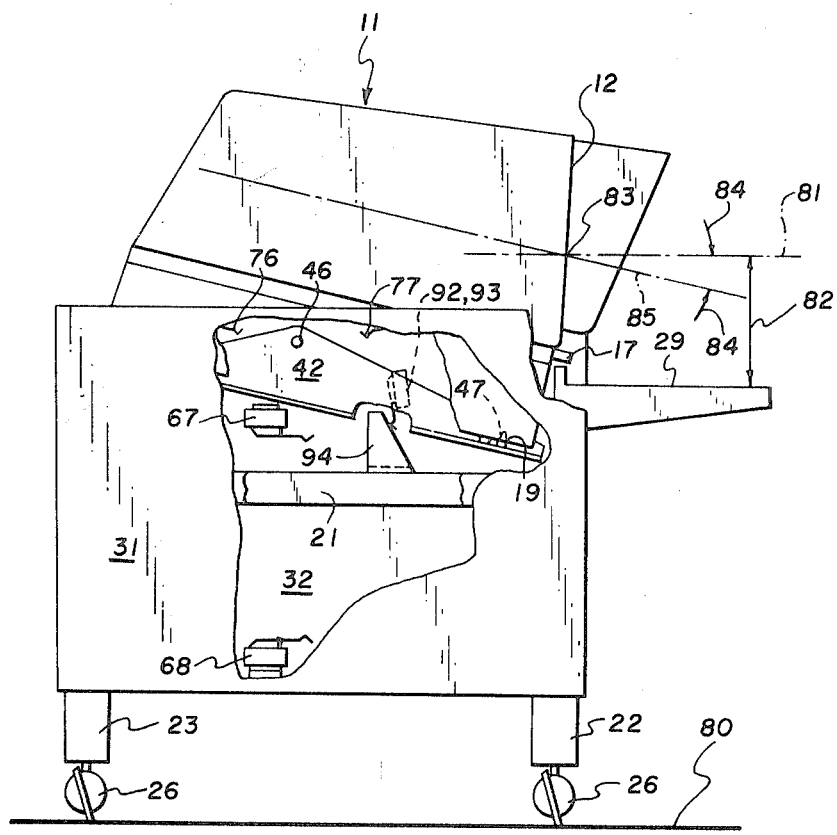
FIG. 14 is a side elevation view similar to that of FIG. 10, showing a cam plate and a switching assembly for preventing the angular adjustment of the apparatus to a forward tilted position relative to the selected elevation thereof.

If the carriage assembly 40 is supporting the projected image viewing apparatus 10 at an elevation and tilted position wherein the knobs 17 at the front of the optical reader 11 nearly abut a lip portion 90 of the worksheelf 29 so as to obstruct vertical adjustment in a lowering manner, or angular adjustment in a forward tilting direction, of such apparatus; then, as is apparent from FIGS. 9 and 14, initiation of such vertical or angular adjustment may shear the knobs off the optical reader. To obviate such a problem, there is provided a cam plate 91 which is mounted on the U-shaped frame member 21 and a pair of switches 92 and 93 which are secured together by a member 94 in side-by-side relation and mounted on the carriage end member 42, see FIG. 7. The cam plate and the pair of switches are arranged to contact each other when the knobs at the front of the optical reader nearly abut the lip portion of the worksheelf, as shown in FIG. 14; whereupon, the pair of switches are simultaneously opened in response to such contact with the cam plate. As will be apparent from the description of FIG. 8 provided below, when the pair of switches 92 and 93 are open, depression of the "tilt forward" button 103 causes the carriage assembly 40 together with the shell 30 to be raised until such switches close (and the knobs 17 no longer abut the lip portion 90), whereupon the carriage assembly (and the apparatus 10) are angularly adjusted in a forward tilting direction. Should this forward tilting adjustment reopen the pair of switches, the raising operation will again occur provided that the maximum elevation switch 68 has not been opened by the U-shaped frame member 21 (FIG. 11) or the maximum forward tilt switch 76 has not been opened by the carriage assembly (FIG. 12). As will also be apparent from the below description of FIG. 8, when the pair of switches 92 and 93 are open, no effect is caused in response to depression of the "lower" button 102, while individual depression of the "raise" button 101 or the "tilt backward" button 104 will respectively cause the apparatus 10 to be raised or tilted backward and then compensatingly lowered.

To carry out the vertical, angular and combined, i.e. interlocked, vertical and angular adjustments described above, there is provided an electrical circuit as shown in FIG. 8 which electromechanically controls the operations respectively initiated in response to depression of the buttons 101-104. With reference to the schematically shown "tilt forward" button 103, if the double-pole single-switch 105 is in its illustrated position 1, i.e. the button 103 is not depressed, and alternating current 106 is supplied to the circuit, then the solenoid 108 within a relay 107 will be actuated upon the resulting energization of the inductor 118 through the condenser 119 to respectively throw the switches 109 and 110 from their illustrated position 1 to the position 2. Similarly, the solenoid 112 within a relay 111 will be actuated upon the resulting energization of the inductor 120 through the condenser 121 to respectively throw the switches 113 and 114 from their illustrated position 1 to the position 2. However, the bidirectional tilt adjusting motor 72 and the bidirectional elevation adjusting motor 66 will not be actuated, so that position 1 for the switch 105 is considered neutral. If the switch 105 is now thrown from position 1 to position 2, i.e. the button 103 is depressed, the solenoids 108 and 112 will be deactuated upon the resulting deenergization of the inductors 118 and 120 through the condensers 119 and 121 so as to respectively throw the switches 109, 110, 113 and 114 from the position 2 to their illustrated position 1. Moreover, simultaneous signals will be generated, one of which actuates the motor 72 for angular adjustment of the carriage assembly 40 in a forward tilting direction if the maximum forward tilt switch 76 and the switch 92 are closed, and the other of which actuates the motor 66 for vertical adjustment of such vertical adjustment of such carriage together with the shell 30 in a raising manner if the maximum elevation switch 68 is closed. Accordingly, it can be seen how depression of the "tilt forward" button 103 will automatically cause the carriage assembly to be tilted forward and, together with the shell, compensatingly raised.

With reference to the schematically shown "tilt rearward" button 104, if the double-pole single-throw switch 115 is in its illustrated position 1, i.e. the button 104 is not depressed, and alternating current 106 is supplied to the circuit, then as the switch 105 is in its illustrated position 1 the solenoids 108 and 112 will be actuated whereby the switches 109, 110, 113 and 114 are respectively thrown from their illustrated position 1 to the position 2 in the manner described above. If the switch 115 is now thrown from position 1 to position 2, i.e. the button 104 is depressed, the switches 109, 110, 113 and 114 remain in their respective position 2 and simultaneous signals will be generated, one of which actuates the motor 72 for angular adjustment of the carriage assembly 40 in a rearward tilting direction if the maximum rearward tilt switch 77 is closed, and the other of which actuates the motor 66 for vertical adjustment of such carriage together with the shell 30 in a lowering manner if the minimum elevation switch 67 and the switch 93 are closed. Accordingly, it can be seen how depression of the "tilt rearward" button 104 will automatically cause the carriage assembly to be tilted rearward and, together with the shell, compensatingly lowered.

With reference to the schematically shown "raise" button 101, if the double-pole single-throw switch 116 is in its illustrated position 1, i.e. the button 101 is not depressed, and alternating current 106 is supplied to the circuit, then as the switch 105 is in its illustrated position 1 the solenoids 108 and 112 will be actuated to respectively throw the switches 109, 110, 113 and 114 from their illustrated position 1 to the position 2 in the manner described above. If the switch 116, which comprises members 116-1 and 116-2 thereof, is now thrown from position 1 to position 2, i.e. the button 101 is depressed, the solenoid 112 will be deactuated upon the resulting deenergization of the inductor 120 through the condenser 121 so as to respectively throw the switches 113 and 114 from the position 2 to their illustrated position 1. Moreover, a signal will be generated which actuates the motor 66 for vertical adjustment of the carriage assembly 40 together with the shell 30 in a raising manner if the maximum elevation switch 68 is closed. Accordingly, it can be seen how depression of the "raised" button 101 will automatically cause the carriage assembly together with the shell to be raised.

With reference to the schematically shown "lower" button 102, if the switch 117 is in its illustrated position 1, i.e. the button 101 is not depressed, and alternating current 106 is supplied to the circuit, then as the switch 105 is in its illustrated position 1 the solenoids 108 and 112 will be actuated to respectively throw the switches 109, 110, 113 and 114 from their illustrated position 1 to the position 2 in the manner described above. If the switch 117 is now thrown from position 1 to position 2, i.e. the button 102 is depressed, the switches 113 and 114 remain in their respective position 2 and a signal will be generated which actuates the motor 66 for vertical adjustment of the carriage assembly 40 together with the shell 30 in a lowering manner if the minimum elevation switch 67 and the switch 93 are closed. Accordingly, it can be seen how depression of the "lower" button 102 will automatically cause the carriage assembly together with the shell to be lowered.

The operation and utility of the support 20 for the projected image viewing apparatus 10 are apparent in large measure from the above description. However, it should be understood that although the support is described as one for use with a projected image viewer, within the broadest aspects of the present invention the support may be used with any apparatus for which it is desirable. Moreover, it will be appreciated that the support can be used in orientations other than as illustrated.

I claim:

1. For use with a projected image viewing apparatus of the type wherein there is provided a screen which displays an image projected thereon for viewing by an observer and wherein a point is selectively located on the screen, a support for such viewing apparatus, which comprises:
   means for elevatingly adjusting the viewing apparatus to any one of a plurality of elevations relative to the observer;
   means for angularly adjusting the viewing apparatus to any one of a plurality of tilted positions relative to a selected one of the plurality of elevations in a manner such that an angle at which the screen is viewed by the observer can be varied; and
   means, operatively associated with said elevatingly and angularly adjusting means, for fixing the point on the screen relative to the selected elevation in response to angular adjustment of the viewing apparatus to a selected one of the plurality of tilted positions.

2. A support for such viewing apparatus as recited in claim 1, in which said elevatingly and angularly adjusting means and said means operatively associated therewith comrpises:
   a carriage for supporting the viewing apparatus at any one of the plurality of elevations and tilted positions.

3. For use with a projected image viewing apparatus of the type wherein there is provided a screen which displays an image projected thereon for viewing by an observer and wherein a point is selectively located on the screen, a support for such viewing apparatus, which comprises:
   a frame;
   a shell for housing said frame, said shell being arranged on said frame in elevation adjustable relation thereto;
   means, supported by said shell, for elevatingly adjusting the viewing apparatus and said shell to any one of a plurality of elevations relative to said frame;
   means, supported by said shell, for angularly adjusting the viewing apparatus to any one of a plurality of tilted positions relative to a selected one of the plurality of elevations in a manner such that an angle at which the screen is viewed by the observer can be varied; and
   means, supported by said shell and operatively associated with said elevatingly and angularly adjusting means, for fixing the point on the screen relative to the selected elevation in response to angular adjustment of the viewing apparatus to a selected one of the plurality of tilted positions.

4. A support for such viewing apparatus as recited in claim 3, in which said elevatingly and angularly adjusting means and said means operatively associated therewith comprises:
   a carriage for supporting the viewing apparatus at any one of the plurality of elevations and tilted positions, said carriage being pivotally connected to said shell for angular adjustment thereof with the viewing apparatus to any one of the plurality of tilted positions.

5. A support for such viewing apparatus as recited in claim 4, which further comprises:
   a workshelf, and in which:

said shell has a substantially vertical extending slot; and said frame has means, extending through said slot, for mounting said workshelf on said frame in fixed relation thereto, whereby said carriage together with said shell may be elevatingly adjusted relative to said workshelf while said carriage is angularly adjusted relative to said workshelf.

6. A support for such viewing apparatus as recited in claim 4, in which said elevatingly adjusting means comprises:

first bidirectional drive means for elevatingly adjusting said carriage together with said shell in raising and lowering manners relative to said frame, in which said angularly adjusting means comprises:

second bidirectional drive means for angularly adjusting said carriage in forward and rearward tilting directions relative to the selected elevation, and in which said means operatively associated with said elevatingly and angularly adjusting means comprises:

switching means for interconnecting said first and second bidirectional drive means to simultaneously raise and tilt forward said carriage and to simultaneously lower and tilt rearward said carriage.

7. A support for such viewing apparatus as recited in claim 6, which further comprises:

first switching means, disposed in fixed relation to said shell and cooperable with said frame, for restricting the elevational adjustment of said carriage together with said shell between maximum and minimum elevations relative to said frame; and second switching means, disposed in fixed relation to said shell and cooperable with said carriage, for restricting the angular adjustment of said carriage between maximum forward and maximum rearward tilted positions relative to the selected elevation.

* * * * *